US011151512B2

(12) United States Patent
Jones

(10) Patent No.: US 11,151,512 B2
(45) Date of Patent: Oct. 19, 2021

(54) INTERLOCKING BLOCKCHAINS FOR AIRCRAFT PART HISTORY AND CURRENT AIRCRAFT CONFIGURATION

(71) Applicant: The Boeing Company, Chicago, IL (US)

(72) Inventor: Nicholas William Jones, North Vancouver (CA)

(73) Assignee: The Boeing Company, Chicago, IL (US)

( * ) Notice: Subject to any disclaimer, the term of this patent is extended or adjusted under 35 U.S.C. 154(b) by 24 days.

(21) Appl. No.: 16/221,308

(22) Filed: Dec. 14, 2018

(65) Prior Publication Data
US 2020/0193363 A1 Jun. 18, 2020

(51) Int. Cl.
*G06Q 10/08* (2012.01)
*G06F 16/18* (2019.01)
*G06Q 10/00* (2012.01)
*H04L 9/06* (2006.01)

(52) U.S. Cl.
CPC ....... *G06Q 10/087* (2013.01); *G06F 16/1805* (2019.01); *G06Q 10/20* (2013.01); *H04L 9/0643* (2013.01); *H04L 2209/38* (2013.01)

(58) Field of Classification Search
CPC .................................. G06F 11/07; G06F 21/64
See application file for complete search history.

(56) References Cited

U.S. PATENT DOCUMENTS

| 9,183,679 B2 * | 11/2015 | Plante | H04N 5/76 |
| 9,740,554 B2 * | 8/2017 | Swayne | G06F 11/0739 |
| 9,774,578 B1 * | 9/2017 | Ateniese | H04L 9/3242 |
| 10,108,812 B2 * | 10/2018 | Ansari | G06Q 20/389 |

(Continued)

FOREIGN PATENT DOCUMENTS

| CN | 107679857 A | 2/2018 |
| WO | 2018153378 A1 | 8/2018 |

OTHER PUBLICATIONS

Irfan Anjum Manarvi,"A Methodology of Evolving User Requirements to Launch ERP in Aircraft Industry Environment" Department of Engineering Management, Center of Advanced Studies in Engineering, Islamabad, Pakistan, 2008 IEEE Aerospace Conference (pp. 1-21) (Year: 2008).*

(Continued)

*Primary Examiner* — Oluseye Iwarere
(74) *Attorney, Agent, or Firm* — Yee & Associates, P.C.

(57) ABSTRACT

A method and apparatus for recording information for a part, such as history information for an aircraft part. A part history blockchain network comprises part history blockchains for the part that are configured to record the information for the part. Configuration and activity history information for the vehicle is recorded in vehicle configuration and activity history blockchains for the vehicle in a vehicle configuration and activity history blockchain network. A part installation notification is received by the part history blockchain network. The part installation notification identifies the part and indicates that the part is installed on the vehicle. The part history blockchains for the part are locked in response to receiving the part installation notification to prevent adding information for the part to the part history blockchains for the part for as long as the part is installed on the vehicle.

20 Claims, 6 Drawing Sheets

(56) References Cited

U.S. PATENT DOCUMENTS

| | | | | |
|---|---|---|---|---|
| 2002/0198618 | A1* | 12/2002 | Madden | G05B 19/41815 |
| | | | | 700/101 |
| 2007/0233341 | A1* | 10/2007 | Logsdon | G07C 5/008 |
| | | | | 701/31.5 |
| 2009/0146832 | A1* | 6/2009 | Ebert | G06K 17/00 |
| | | | | 340/8.1 |
| 2009/0222427 | A1* | 9/2009 | Malkowicz | G06F 16/2477 |
| 2015/0154538 | A1* | 6/2015 | Skaaksrud | H04W 4/029 |
| | | | | 705/333 |
| 2015/0269570 | A1* | 9/2015 | Phan | G06Q 20/382 |
| | | | | 705/71 |
| 2015/0286994 | A1* | 10/2015 | Elder | G06Q 10/20 |
| | | | | 705/305 |
| 2016/0330034 | A1 | 11/2016 | Back et al. | |
| 2016/0364285 | A1* | 12/2016 | Swayne | G06Q 10/063 |
| 2017/0213209 | A1 | 7/2017 | Dillenberger | |
| 2017/0323231 | A1 | 11/2017 | Johnson et al. | |
| 2017/0323239 | A1 | 11/2017 | Johnson et al. | |
| 2017/0323240 | A1 | 11/2017 | Johnson et al. | |
| 2017/0323274 | A1 | 11/2017 | Johnson et al. | |
| 2017/0323403 | A1 | 11/2017 | Johnson et al. | |
| 2017/0345011 | A1 | 11/2017 | Salami et al. | |
| 2018/0018723 | A1 | 1/2018 | Nagla et al. | |
| 2018/0053158 | A1 | 2/2018 | White | |
| 2018/0083785 | A1 | 3/2018 | Shields et al. | |
| 2018/0115428 | A1 | 4/2018 | Lysenko et al. | |
| 2018/0130050 | A1* | 5/2018 | Taylor | H04L 9/3247 |
| 2018/0165476 | A1 | 6/2018 | Carey et al. | |
| 2018/0225651 | A1 | 8/2018 | Stone et al. | |
| 2018/0270244 | A1 | 9/2018 | Kumar et al. | |
| 2018/0315055 | A1* | 11/2018 | Pickover | H04L 9/3297 |
| 2018/0336515 | A1* | 11/2018 | Mehring | H04L 9/0637 |
| 2019/0012752 | A1 | 1/2019 | Rockafellow et al. | |
| 2019/0165932 | A1* | 5/2019 | Vincent | H04L 9/3247 |
| 2019/0342290 | A1* | 11/2019 | Mittal | H04L 63/083 |
| 2019/0362376 | A1* | 11/2019 | Newell | H04L 9/0643 |
| 2019/0378352 | A1 | 12/2019 | Dey et al. | |
| 2020/0026619 | A1 | 1/2020 | Kaji et al. | |
| 2020/0043253 | A1 | 2/2020 | Jones | |
| 2020/0073651 | A1 | 3/2020 | Rodriguez Bravo et al. | |
| 2020/0137082 | A1* | 4/2020 | Jimenez-Delgado | |
| | | | | H04L 9/0637 |
| 2020/0167459 | A1* | 5/2020 | Viale | H04L 9/3239 |
| 2020/0184739 | A1* | 6/2020 | Nathan | G06Q 10/20 |
| 2020/0186360 | A1* | 6/2020 | Chan | H04L 9/3066 |
| 2020/0258085 | A1* | 8/2020 | Moustakas | G06Q 20/3827 |
| 2021/0133888 | A1 | 5/2021 | Leise et al. | |

OTHER PUBLICATIONS

Xinhong Hei "Distributed Interlocking System and Its Safety Verification" College of Science and Technology, NIHON University, 2006 6th World Congress on Intelligent Control and Automation (vol. 2, pp. 8612-8615) (Year: 2009).*

European Patent Office Extended Search Report, dated May 6, 2019, regarding Application No. 19164694.2, 8 pages.

Office Action, dated Jun. 13, 2019, regarding U.S. Appl. No. 15/933,377, 13 pages.

Notice of Allowance, dated Jul. 25, 2019, regarding U.S. Appl. No. 15/933,377, 10 pages.

Gutierrez, "Boeing Improves Operations with Blockchain and the Internet of Things," Cloud Foundry Live, Altoros, May 24, 2017, 13 pages. https://www.altoros.com/blog/boeing-improves-operations-with-blockchain-and-the-internet-of-things/.

Higgens, "GE Patent Filings Hint at Blockchain Role in Aircraft Management;" Coindesk, Nov. 9, 2017, 4 pages. https://www.coindesk.com/ge-patent-filings-hint-at-blockchain-role-in-aircraft-management/.

Sharma, "Blockchain Use Cases for Aviation Industry," Blockchain Council, Nov. 21, 2017, 8 pages. https://www.blockchain-council.org/blockchain/blockchain-use-cases-for-aviation-industry/.

Nandi, "Blockchain Opportunity in Aviation Industry," Pulse, LinkedIn, Oct. 3, 2017, 4 pages. https://www.linkedin.com/pulse/blockchain-opportunity-aviation-industry-udayan-nandi/.

Young, "Air France Tests the Blockchain to Trace Aviation Supply Chain," BTCManager, Oct. 11, 2017, 6 pages. https://btcmanager.com/air-france-tests-blockchain-for-aviation-supply-chain/.

De Vos, "Blockchain for aviation asset management," Wearefinn, Jan. 8, 2017, 10 pages. https://www.wearefinn.com/topics/posts/blockchain-for-aviation-asset-management/.

'Galeon, ""One of the World's Largest Airlines Is Looking Into Blockchain Technology,"" Futurism, FutureSociety, Oct. 6, 2017, 4 pages. https://futurism.com/one-of-the-worlds-largest-airlines-is-looking-into-blockchain-technology/.

De Vos, "Disrupting Aviation with Blockchain," IFS Blog, Jun. 30, 2017, 4 pages. http://blog.ifsworld.com/2017/06/disrupting-aviation-blockchain/.

Canaday, "Blockchain in MRO Could Happen Sooner Than You Think," MRO Network, Oct. 26, 2017, 8 pages. http://www.mro-network.com/big-data/blockchain-mro-could-happen-sooner-you-think.

Bellamy, III, "Air France KLM is Evaluating MRO Potential for Blockchain," Aviation Today, Oct. 3, 2017, 5 pages. http://www.aviationtoday.com/2017/10/03/air-france-klm-evaluating-mro-potential-blockchain/.

Bellamy, III, "IOT, Blockchain Proposed to Improve Aircraft Maintenance Process," Aviation Today, Jan. 13, 2017, 5 pages. http://www.aviationtoday.com/2017/01/13/iot-blockchain-proposed-to-improve-aircraft-maintenance-process/.

Reid, "Blockchain set to disrupt aviation within 2 years claims Accenture," CNBC, Paris Airshow 2017, Jun. 27, 2017, 5 pages. https://www.cnbc.com/2017/06/27/blockchain-set-to-disrupt-aviation-within-2-years-claims-accenture.html.

"The Potential of Blockchain Technology for Airlines," Accenture, accessed Mar. 14, 2018, 3 pages. https://www.accenture.com/ca-en/insight-potential-blockchain-technology-for-airlines.

Jones, "Blockchain Configuration History for Aircraft Maintenance, Modification, and Activity Tracking," The Boeing Company, U.S. Appl. No. 15/933,377, filed Mar. 23, 2018, 34 pages.

Extended European Search Report dated Apr. 28, 2020 regarding European Application No. 19203371.0; 8 pgs.

Nathan K. et al. "Smart Detection and Isolation of Suspected and Unapproved Aircraft Components Using Blockchain"; IP.com; No. IPCOM000255264D; Sep. 13, 2018; 8 pgs.

Stefan Beyer; "Blockchain Interoperability—Moving Assets Across Chains"; Nov. 5, 2018; https://medium.com/cryptronics/blockchain-interoperability-moving-assets-across-chains-e5203357d949; 10 pgs.

Michael Borkowski et al.; Caught in Chains: Claim-First Transactions for Cross-Blockchain Asset Transfers; Aug. 1, 2018; https://www.researchgate.net/publication/327364072_Caught_in_Chains_Claim-First_Transactions_for_Cross-Blockchain_Asset_Transfers; 7 pgs.

Ahrash Aleshi; "Secure Aircraft Maintenance Records Using Blockchain (SAMR)"; Dissertations and Theses; 379; Jan. 1, 2018; https://commons.erau.edu/cgi/viewcontent.cgi?article=13788.context=edt; 72 pgs.

European Patent Office Communication, dated Apr. 1, 2020, regarding Application No. 19164694.2, 7 pages.

Office Action, dated Apr. 6, 2020 regarding U.S. Appl. No. 15/933,377; 25 pages.

Office Action, dated Jun. 24, 2020, regarding U.S. Appl. No. 15/933,377; 26 pages.

European Patent Office Oral Summons, dated Dec. 7, 2020, regarding Application No. 19164694.2, 12 pages.

Final Office Action, dated Oct. 14, 2020, regarding U.S. Appl. No. 15/933,377, 37 pages.

Office Action dated Jun. 10, 2021, regarding USPTO U.S. Appl. No. 15/933,377, 18 pages.

\* cited by examiner

INTERLOCKING BLOCKCHAINS FOR AIRCRAFT PART HISTORY AND CURRENT AIRCRAFT CONFIGURATION

CROSS-REFERENCE TO RELATED APPLICATION

This application is related to U.S. patent application Ser. No. 15/933,377, filed on Mar. 23, 2018, for "Blockchain Configuration History for Aircraft Maintenance, Modification, and Activity Tracking", the disclosure of which is incorporated by reference herein in its entirety.

BACKGROUND INFORMATION

1. Field

The present disclosure relates generally to systems and methods for maintaining, modifying, and tracking the operation of aircraft and other vehicles and parts for aircraft and other vehicles. More particularly, the present disclosure relates to a system and method using interlocking blockchains for the maintenance, modification, and activity tracking of aircraft and other vehicles and parts for aircraft and other vehicles.

2. Background

The current configuration or state of an aircraft comprises all of the systems and parts currently installed on the aircraft. It is desirable that the current configuration of an aircraft is accurately known. For example, it is desirable for maintenance personnel to know the current configuration of an aircraft before performing maintenance operations on the aircraft or making other modifications of the aircraft.

There is not a standardized or uniform approach for tracking the current configuration of an aircraft that is used by airlines and other aircraft operators. Some airlines and other aircraft operators may take an individual, self-developed approach to rigorously determine the configuration of an aircraft when it is first received and then to track any changes that are made to the aircraft. Other airlines and other aircraft operators may not make a significant effort to track the current configuration of an aircraft continuously. In this case, the airline or other operator of the aircraft may determine the current configuration of the aircraft by inspecting the aircraft when work is to be performed on the aircraft or when the current configuration of the aircraft needs to be known for some other reason.

It is also desirable to have accurate information regarding parts that may be installed on an aircraft, that are installed on an aircraft, or that have been installed on an aircraft. For example, it may be desirable to have accurate information regarding the creation of a part, use of a part, repair of a part, modification of a part, destruction or other ultimate disposition of a part, or of other events or combinations of events that affect a part for an aircraft.

A blockchain is a continuously growing list of records, called blocks, which are linked and secured using cryptography. Each block in a blockchain typically contains a cryptographic hash of the previous block, a timestamp, and transaction data. A blockchain is inherently resistant to modification of the data stored in the blockchain. A blockchain may be used as a decentralized, distributed, and public or private permissions based digital ledger for recording transactions across many computers. A blockchain is typically managed by a peer-to-peer network collectively adhering to a protocol for validating new blocks. Once recorded, the data in any given block cannot be altered retroactively without the alteration of all subsequent blocks, which requires collusion of the blockchain network.

Therefore, there may be a need for a method and apparatus that take into account at least some of the issues discussed above, as well as other possible issues.

SUMMARY

Illustrative embodiments provide a method of installing a part on a vehicle. Information regarding installation of the part on the vehicle is received. Information for the part is recorded in part history blockchains for the part in a part history blockchain network. The information regarding the installation of the part is recorded in vehicle configuration and activity history blockchains for the vehicle in a vehicle configuration and activity history blockchain network. The part history blockchains for the part are locked to prevent adding information for the part to the part history blockchains for the part for as long as the part is installed on the vehicle.

Illustrative embodiments also provide a method of recording information for a part. A part history blockchain network comprises part history blockchains for the part that are configured to record the information for the part. Configuration and activity history information for a vehicle is recorded in vehicle configuration and activity history blockchains for the vehicle in a vehicle configuration and activity history blockchain network. A part installation notification is received by the part history blockchain network. The part installation notification identifies the part and indicates that the part is installed on a vehicle. The part history blockchains for the part are locked in response to receiving the part installation notification to prevent adding the information for the part to the part history blockchains for the part for as long as the part is installed on the vehicle.

Illustrative embodiments also provide an apparatus for recording information for a part. A data processing system in a part history blockchain network is configured to receive a part installation notification. The part installation notification identifies the part and indicates that the part is installed on a vehicle. The part history blockchain network comprises part history blockchains for the part that are configured to record the information for the part. Configuration and activity history information for the vehicle is recorded in vehicle configuration and activity history blockchains for the vehicle in a vehicle configuration and activity history blockchain network. The data processing system is configured to lock the part history blockchains for the part in response to receiving the part installation notification to prevent adding the information for the part to the part history blockchains for the part for as long as the part is installed on the vehicle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
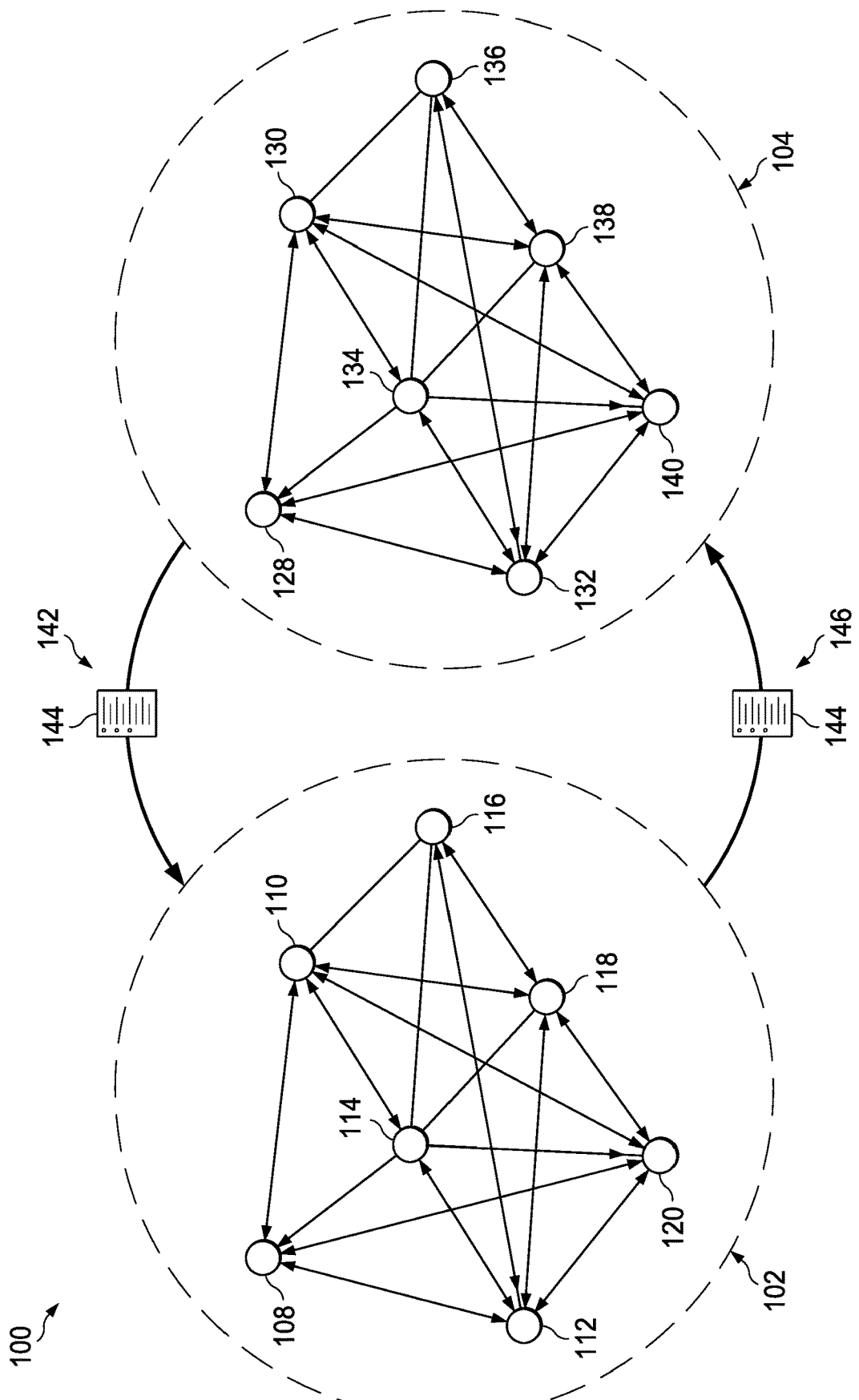
FIG. 1 is an illustration of interlocking blockchain networks in accordance with an illustrative embodiment.

The illustrative embodiments recognize and take into account different considerations. For example, the illustrative embodiments recognize and take into account that the configuration of an aircraft may be known and documented when the aircraft is first delivered from an aircraft manufacturer to an operator of the aircraft. However, after delivery, the current aircraft configuration may not be known with certainty as changes are made to the aircraft for maintenance, repairs, or upgrades. The reliability of current aircraft configuration information may be questionable if record keeping has been inconsistent. If current aircraft configuration information cannot be relied upon as being accurate, maintenance personnel may have to spend time to inspect an aircraft and then research and review the actual parts installed on the aircraft before work is performed on the aircraft.

A related issue may occur when an aircraft is transferred from one operator to another. For example, if current aircraft configuration records cannot be relied upon, an airline that receives an aircraft from another airline may need to perform a significant amount of inspection work to confirm the current configuration of the aircraft being received.

Illustrative embodiments also recognize and take into account that currently the history and status of parts for an aircraft may be unclear or questionable, depending upon the nature of the supplier of the parts. In some cases, history and status records for aircraft parts may be falsified or otherwise be inaccurate. For example, the history and status records for a part that is offered by a supplier for installation on an aircraft may actually be the records for another part that is currently already installed on an aircraft.

Illustrative embodiments use interlocking blockchains to improve the accuracy and reliability of records regarding the configuration and activity history of aircraft and other vehicles and of records regarding the history of parts for an aircraft or other vehicle. Illustrative embodiments provide a system and method whereby records in one blockchain are locked when a transition has occurred related to an item being tracked by or related to another item in another blockchain.

For example, illustrative embodiments provide interlocking blockchain networks for vehicle configuration and activity history records and part history records. Information describing events that make changes to a vehicle or otherwise affect the vehicle are recorded in vehicle configuration and activity history blockchains in a vehicle configuration and activity history blockchain network. Information describing events that change a part or otherwise affect the part are recorded in part history blockchains in a part history blockchain network.

Information regarding the installation of a part on a vehicle may be recorded in vehicle configuration and activity history blockchains in the vehicle configuration and activity history blockchain network and in part history blockchains for the part in the part history blockchain network. In response to the part being installed on the vehicle, the part history blockchains for the part in the part history blockchain network are locked, so that no changes to the part history for the part may be recorded in the part history blockchains. The part history blockchains remain locked as long as the part is installed on the vehicle. Information regarding removal of the part from the vehicle may be recorded in the vehicle configuration and activity history blockchains in the vehicle configuration and activity history blockchain network. In response to the part being removed from the vehicle, the part history blockchains for the part in the part history blockchain network may be unlocked, so that information regarding removal of the part from the vehicle and information regarding subsequent events that change or otherwise affect the part may be recorded in the part history blockchains for the part in the part history blockchain network.

Part history blockchains and blockchain networks and vehicle configuration and activity history blockchains and blockchain networks in accordance with an illustrative embodiment are based upon blockchain technology that allows distributed record maintenance with ease of data transactions and high data veracity. Illustrative embodiments may be implemented in a cloud computing environment and widely distributed to make the use of interlocking blockchains for maintaining aircraft configuration and activity history records and aircraft part history records highly accessible to airlines, other aircraft operators, and maintenance, repair, and operations providers and systems. Illustrative embodiments may be interoperable with existing maintenance, repair, and operations systems via, for example, application programming interface calls.

Turning to FIG. 1, an illustration of interlocking blockchain networks is depicted in accordance with an illustrative embodiment. Interlocking blockchain networks 100 include vehicle configuration and activity history blockchain network 102 and part history blockchain network 104.

Vehicle configuration and activity history blockchain network 102 is configured to maintain records of information regarding events that affect the configuration of an aircraft or other vehicle or that otherwise affect the aircraft or other vehicle. Vehicle configuration and activity history blockchain network 102 comprises a plurality of nodes. A vehicle configuration and activity history blockchain network in accordance with an illustrative embodiment may comprise any appropriate number of nodes. In this example, vehicle configuration and activity history blockchain network 102 comprises nodes 108, 110, 112, 114, 116, 118, and 120. A vehicle configuration and activity history blockchain network in accordance with an illustrative embodiment may have more or fewer nodes than illustrated in FIG. 1.

Information for events that affect the configuration of a vehicle or that otherwise affect the vehicle may be recorded in vehicle configuration and activity history blockchains for the vehicle in vehicle configuration and activity history blockchain network 102. Each node 108, 110, 112, 114, 116, 118, and 120 in vehicle configuration and activity history blockchain network 102 may store a full copy of the vehicle configuration and activity history blockchain for the vehicle. A more detailed description of an example of vehicle configuration and activity history blockchain network 102 is presented below with reference to FIG. 2.

Part history blockchain network 104 is configured to maintain records of information regarding events that change or otherwise affect a part for an aircraft or other vehicle. Part history blockchain network 104 comprises a plurality of nodes. A part history blockchain network in accordance with an illustrative embodiment may comprise any appropriate number of nodes. In this example, part history blockchain network 104 comprises nodes 128, 130, 132, 134, 136, 138, and 140. A part history blockchain network in accordance with an illustrative embodiment may have more or fewer nodes than illustrated in FIG. 1.

Information for events that change or otherwise affect a part may be recorded in part history blockchains for the part in part history blockchain network 104. Each node 128, 130, 132, 134, 136, 138, and 140 in part history blockchain network 104 may store a full copy of the part history blockchain for the part. A more detailed description of an example of part history blockchain network 104 is presented below with reference to FIG. 3.

The part history for a particular part may be maintained in part history blockchains for the part in part history blockchain network 104. When that part is installed in a vehicle for which configuration and activity history information is maintained in vehicle configuration and activity history blockchains in vehicle configuration and activity history blockchain network 102, locking transaction 142 may be implemented. As part of locking transaction 142, token 144 representing the part may be passed from part history blockchain network 104 to vehicle configuration and activity history blockchain network 102 to indicate that the part is now installed on or otherwise associated with a particular vehicle. The part history blockchains for the part in part history blockchain network 104 are locked as part of locking transaction 142. When part history blockchains for the part are locked, no further transactions or events that may change the part history blockchains for the part will be recognized, given that the part is installed on a vehicle. The part history blockchains for the part in part history blockchain network 104 may remain locked for as long as the part is installed on the vehicle.

When the part is removed from the vehicle, unlocking transaction 146 may be implemented. As part of unlocking transaction 146, token 144 representing the part may be passed back from vehicle configuration and activity history blockchain network 102 to part history blockchain network 104. The part history blockchains for the part in part history blockchain network 104 are unlocked as part of unlocking transaction 146. When part history blockchains for the part are unlocked, information for events that change or otherwise affect the part may be recorded in the part history blockchains for the part. For example, the first transaction that a part history blockchain for the part may accept after unlocking of the part history blockchain by unlocking transaction 146 may be a record of information regarding removal of the part from the vehicle.

The illustration of interlocking blockchain networks 100 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 2:
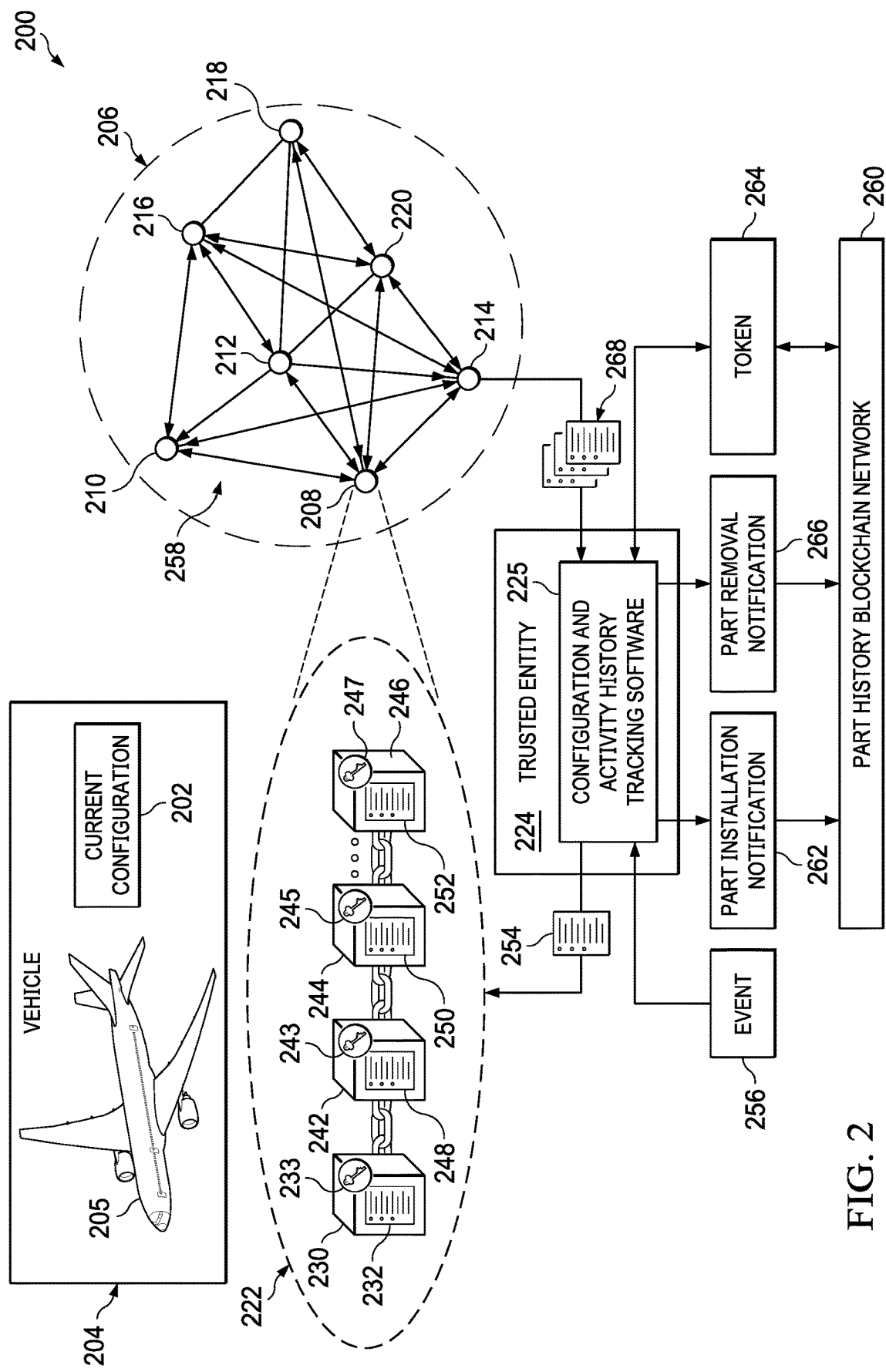
FIG. 2 is an illustration of a vehicle configuration and activity history tracking system in accordance with an illustrative embodiment.

Turning to FIG. 2, an illustration of a vehicle configuration and activity history tracking system is depicted in accordance with an illustrative embodiment. Vehicle configuration and activity history tracking system 200 is configured to track accurately current configuration 202 of vehicle 204. Vehicle configuration and activity history tracking system 200 may be configured to track current configuration 202 of any appropriate number of various types of vehicles.

For example, without limitation, vehicle configuration and activity history tracking system 200 may be an aircraft configuration and activity history tracking system configured to track current configuration 202 of aircraft 205. Vehicle configuration and activity history tracking system 200 may be used to track current configuration 202 of vehicle 204 other than aircraft 205. In an alternative embodiment, vehicle configuration and activity history tracking system 200 may be used to track the current configuration of a fixed or moveable platform other than a vehicle.

Aircraft 205 may be any appropriate type of aircraft that may be configured to perform any appropriate operation or mission. For example, without limitation, aircraft 205 may be a commercial passenger aircraft, a cargo aircraft, a military aircraft, a personal aviation aircraft or any other appropriate type of aircraft. Aircraft 205 may be a fixed wing aircraft, a rotary wing aircraft, or a lighter-than-air aircraft. Aircraft 205 may be a manned aircraft or an unmanned aircraft.

Vehicle configuration and activity history tracking system 200 comprises vehicle configuration and activity history blockchain network 206. Vehicle configuration and activity history blockchain network 206 is an example of one possible implementation of vehicle configuration and activity history blockchain network 102 in FIG. 1. Vehicle configuration and activity history blockchain network 206 is a blockchain network that is set up to store and maintain configuration and activity history information for a number of vehicles. For example, without limitation, vehicle configuration and activity history blockchain network 206 may be a blockchain network that is configured to store and maintain aircraft configuration and activity history information for aircraft 205. In this case, vehicle configuration and activity history blockchain network 206 may be an aircraft configuration and activity history blockchain network.

Vehicle configuration and activity history blockchain network 206 comprised a plurality of nodes. A vehicle configuration and activity history blockchain network in accordance with an illustrative embodiment may comprise any appropriate number of nodes. In this example, vehicle configuration and activity history blockchain network 206 comprises nodes 208, 210, 212, 214, 216, 218, and 220. A vehicle configuration and activity history blockchain network in accordance with an illustrative embodiment may have more or fewer nodes than illustrated in FIG. 2. Each of nodes 208, 210, 212, 214, 216, 218, and 220 in vehicle configuration and activity history blockchain network 206 may be controlled by an entity that has agreed to participate in the operation and use of vehicle configuration and activity history blockchain network 206 for the purpose of accurately tracking the configuration and activity history of aircraft 205 or other vehicle 204 over time.

Vehicle configuration and activity history information is stored in blockchains in vehicle configuration and activity history blockchain network 206. A unique vehicle configuration and activity history blockchain may be created for each aircraft 205 or other vehicle 204 for which configuration and activity history information is to be tracked in vehicle configuration and activity history blockchain network 206. A copy of the vehicle configuration and activity history blockchain for each vehicle 204 may be maintained at each node 208, 210, 212, 214, 216, 218, and 220 in vehicle configuration and activity history blockchain network 206. For example, each node 208, 210, 212, 214, 216, 218, and 220 in vehicle configuration and activity history blockchain network 206 may be configured to store a full copy of vehicle configuration and activity history blockchain 222 for vehicle 204. For example, without limitation, each node 208, 210, 212, 214, 216, 218, and 220 in vehicle configuration and activity history blockchain network 206 may be configured to store a full copy of vehicle configuration and activity history blockchain 222 for aircraft 205. In this case, vehicle configuration and activity history blockchain 222 is an aircraft configuration and activity history blockchain.

Only trusted entity 224 may have permission to access vehicle configuration and activity history blockchain network 206 to read information from and to submit changes to vehicle configuration and activity history blockchain 222 for vehicle 204. For example, without limitation, trusted entity 224 may be the owner or operator of vehicle 204 or any another appropriate trusted entity. For example, without limitation, trusted entity 224 may be an airline or other operator or owner of aircraft 205 that may have permission to read information from and submit changes to vehicle configuration and activity history blockchain 222 for aircraft 205. Another trusted entity 224, such as the manufacturer of aircraft 205, a provider of maintenance and repair operations for aircraft 205, or another appropriate entity, also may have permission to read information from and submit changes to vehicle configuration and activity history blockchain 222 for aircraft 205. Another trusted entity 224 may receive permission to access vehicle configuration and activity history blockchain network 206 for vehicle 204 from the owner of vehicle 204.

Trusted entity 224 may use configuration and activity history tracking software 225 to access vehicle configuration and activity history blockchain 222 at one or more nodes 208, 210, 212, 214, 216, 218, and 220 of vehicle configuration and activity history blockchain network 206. Configuration and activity history tracking software 225 may be configured to run on a data processing system to provide various functions for accessing vehicle configuration and activity history blockchain 222, reading information from vehicle configuration and activity history blockchain 222, using information read from vehicle configuration and activity history blockchain 222, and storing new information in vehicle configuration and activity history blockchain 222 in vehicle configuration and activity history blockchain network 206. Configuration and activity history tracking software 225 may be implemented in any appropriate manner to perform the functions described herein.

Vehicle configuration and activity history blockchain 222 comprises a number of blocks. First block 230 in vehicle configuration and activity history blockchain 222 may be created when vehicle configuration and activity history blockchain 222 for vehicle 204 is added to vehicle configuration and activity history blockchain network 206. For example, without limitation, vehicle configuration and activity history blockchain 222 for aircraft 205 may be added to vehicle configuration and activity history blockchain network 206 when aircraft 205 is a new aircraft to be delivered from an aircraft manufacturer to an aircraft operator. In this case, first block 230 in vehicle configuration and activity history blockchain 222 for aircraft 205 may include record 232 of an initial configuration information location where information identifying the initial configuration of aircraft 205 may be found. The initial configuration information available at the initial configuration information location may describe both the initial components installed in aircraft 205 and any known inconsistencies in aircraft 205 at the end of production of aircraft 205 and before delivery of aircraft 205 from the manufacturer to an operator of aircraft 205.

In the case of a vehicle configuration and activity history blockchain for an active aircraft or other vehicle that is not new being added to vehicle configuration and activity history blockchain network 206, first block 230 in vehicle configuration and activity history blockchain 222 may include record 232 of an initial configuration information location where a known current configuration of aircraft 205 or other vehicle 204 may be found. In any case, first block 230 of vehicle configuration and activity history blockchain 222 may identify the initial configuration information location of the known first current configuration state for aircraft 205 or other vehicle 204 recorded in vehicle configuration and activity history blockchain 222.

First block 230 in vehicle configuration and activity history blockchain 222 may be created and encrypted 233 using a conventional hash value. Subsequent blocks 242, 244, and 246 in vehicle configuration and activity history blockchain 222 may be created and encrypted 243, 245, 247, respectively, using a hash value with each new block referencing the previous blocks in vehicle configuration and activity history blockchain 222. As blocks are added to vehicle configuration and activity history blockchain 222 the robust nature of the encryption increases as the encryption of each subsequent block is based on the previous blocks. As a result, it becomes exponentially more difficult to fraudulently change any of blocks 230, 242, 244, or 246 in vehicle configuration and activity history blockchain 222 without being detected.

Trusted entity 224 with the proper permissions to access vehicle configuration and activity history blockchain network 206 to provide updates to vehicle configuration and activity history blockchain 222 for vehicle 204 may submit transaction 254 to vehicle configuration and activity history blockchain network 206. Transaction 254 may include new information about vehicle 204. Transaction 254 may be generated in response to the occurrence of event 256 that may affect the configuration of vehicle 204 or that involves operation of vehicle 204 that it is desirable to record in vehicle configuration and activity history blockchain network 206. The information included in transaction 254 for recording in vehicle configuration and activity history blockchain network 206 may include appropriate information describing event 256.

For example, information included in transaction 254 for recording in vehicle configuration and activity history blockchain network 206 may include maintenance information, modification information, activity information, or any other appropriate information or combination of information related to the configuration or operation of vehicle 204. Maintenance information may include information describing maintenance operations performed on vehicle 204. For example, without limitation, maintenance information may include information regarding an inspection of parts, repair of parts, or replacement of parts on vehicle 204. Modification information may identify changes to vehicle 204 other than by maintenance operations. Activity information may include information identifying operations of vehicle 204. For example, without limitation, when vehicle 204 is aircraft 205, activity information may identify operations performed by aircraft 205 such as take offs and landings completed, flight hours, changes of ownership, or other activities involving aircraft 205.

Information included in any new transaction 254 added to vehicle configuration and activity history blockchain 222 in vehicle configuration and activity history blockchain network 206 is propagated 258 across vehicle configuration and activity history blockchain network 206 to all nodes 208, 210, 212, 214, 216, 218, and 220 in vehicle configuration and activity history blockchain network 206. At each node 208, 210, 212, 214, 216, 218, and 220 a new block 246 may be added to the copy of vehicle configuration and activity history blockchain 222 maintained therein to include a record 252 of the new information provided by transaction 254 regarding vehicle 204.

In accordance with an illustrative embodiment, event 256 may be the installation of a part on vehicle 204. In this case, transaction 254 may include information identifying the part installed on vehicle 204 that is stored in vehicle configuration and activity history blockchain 222 for vehicle 204 in vehicle configuration and activity history blockchain network 206. History information for the part being installed on vehicle 204 may be recorded in part history blockchain network 260. In this case, configuration and activity history tracking software 225 may be configured to send part installation notification 262 to part history blockchain network 260 to notify part history blockchain network 260 that the part has been installed on vehicle 204. Part installation notification 262 may be provided in any appropriate format and by any appropriate method to part history blockchain network 260.

In response to receiving part installation notification 262, part history blockchain network 260 may send token 264 to aircraft configuration and activity history blockchain network 206 and may lock the part history blockchains for the part in part history blockchain network 260 to prevent any further changes to the information recorded in part history blockchain network 260 for the part. The part history blockchains for the part may remain locked until token 264 is returned to part history blockchain network 260.

Later, event 256 may be the removal of the part from vehicle 204. In this case, transaction 254 may include information indicating that the part has been removed from vehicle 204 that is stored in vehicle configuration and activity history blockchain 222 for vehicle 204 in vehicle configuration and activity history blockchain network 206. In this case, configuration and activity history tracking software 225 may be configured to send part removal notification 266 to part history blockchain network 260 to notify part history blockchain network 260 that the part that was installed on vehicle 204 has been removed. Part removal notification 266 may be provided in any appropriate format and by any appropriate method to part history blockchain network 260.

Token 264 may be returned to part history blockchain network 260 along with or as part of part removal notification 266. In response to receiving token 264, part history blockchain network 260 may unlock the part history blockchains for the part in part history blockchain network 260 to allow changes to the information recorded in part history blockchain network 260 for the part.

Trusted entity 224 with the proper permissions to access vehicle configuration and activity history blockchain 222 for vehicle 204 will be able to access vehicle configuration and activity history blockchain network 206 and read information 268 from vehicle configuration and activity history blockchain 222 for vehicle 204. First block 230 in vehicle configuration and activity history blockchain 222 for vehicle 204 provides record 232 which identifies the location information for the initial configuration of vehicle 204 when vehicle 204 joined vehicle configuration and activity history blockchain network 206. Each of subsequent blocks 242, 244, and 246 includes record 248, 250, 252, respectively, of every subsequent transaction submitted to vehicle configuration and activity history blockchain network 206 for vehicle 204. Trusted entity 224 may thus determine the current configuration of vehicle 204 from this information.

Data veracity for vehicle configuration and activity history blockchain 222 at a node 208, 210, 212, 214, 216, 218, or 220 in vehicle configuration and activity history blockchain network 206 may be verified by checking the equivalent vehicle configuration and activity history blockchain at other nodes in vehicle configuration and activity history blockchain network 206 and comparing hash values for the last blocks in the blockchains. For example, to confirm the veracity of data from vehicle configuration and activity history blockchain 222 obtained from node 208 of vehicle configuration and activity history blockchain network 206, trusted entity 224 may compare the hash value for last block 246 in vehicle configuration and activity history blockchain 222 to the hash value of the last block in the corresponding vehicle configuration and activity history blockchain in one or more other nodes 210, 212, 214, 216, 218, or 220 in vehicle configuration and activity history blockchain network 206.

The illustration of vehicle configuration and activity history tracking system 200 in FIG. 2 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 3:
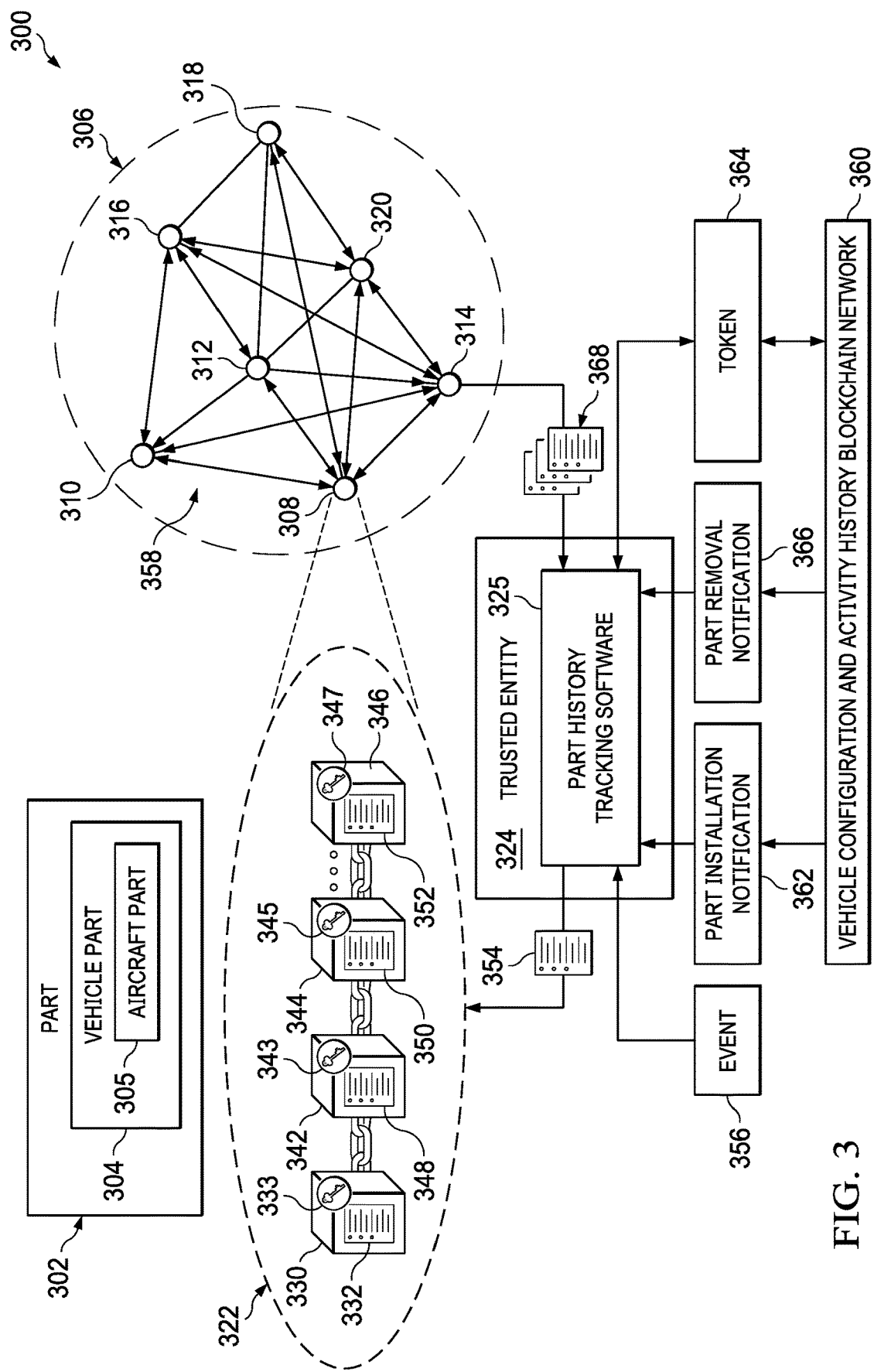
FIG. 3 is an illustration of a part history tracking system in accordance with an illustrative embodiment.

Turning to FIG. 3, an illustration of a part history tracking system is depicted in accordance with an illustrative embodiment. Part history tracking system 300 is configured to track accurately the history of part 302. Part history tracking system 300 may be configured to track the history of any appropriate number of any appropriate various types of parts.

Part history tracking system 300 may be a vehicle part history tracking system that is configured to track the history of vehicle part 304. Vehicle part 304 may be any appropriate part for any appropriate vehicle. For example, vehicle part 304 may be a part for vehicle 204 in FIG. 2. For example, without limitation, part history tracking system 300 may be an aircraft part history tracking system that is configured to track the history of aircraft part 305. Aircraft part 305 may be any appropriate part for any appropriate aircraft. For example, aircraft part 305 may be a part for aircraft 205 in FIG. 2. In an alternative embodiment, part history tracking system 300 may be configured to track the history of a part for a fixed or moveable platform other than a vehicle.

Part history tracking system 300 comprises part history blockchain network 306. Part history blockchain network 306 is an example of one possible implementation of part history blockchain network 104 in FIG. 1 and part history blockchain network 260 in FIG. 2. Part history blockchain network 306 is a blockchain network that is set up to store and maintain history information for a number of parts. For example, without limitation, part history blockchain network 306 may be a blockchain network that is configured to store and maintain aircraft part history information for aircraft part 305. In this case, part history blockchain network 306 may be an aircraft part history blockchain network.

Part history blockchain network 306 comprised a plurality of nodes. A part history blockchain network in accordance with an illustrative embodiment may comprise any appropriate number of nodes. In this example, part history blockchain network 306 comprises nodes 308, 310, 312, 314, 316, 318, and 320. A part history blockchain network in accordance with an illustrative embodiment may have more or fewer nodes than illustrated in FIG. 3. Each of nodes 308, 310, 312, 314, 316, 318, and 320 in part history blockchain network 306 may be controlled by an entity that has agreed to participate in the operation and use of part history blockchain network 306 for the purpose of accurately tracking the history of part 302 over time.

Part history information is stored in blockchains in part history blockchain network 306. A part history blockchain may be created for each part 302 for which history information is to be tracked in part history blockchain network 306. A copy of the part history blockchain for each part 302 may be maintained at each node 308, 310, 312, 314, 316, 318, and 320 in part history blockchain network 306. For example, each node 308, 310, 312, 314, 316, 318, and 320 in part history blockchain network 306 may be configured to store a full copy of part history blockchain 322 for part 302. For example, without limitation, each node 308, 310, 312, 314, 316, 318, and 320 in part history blockchain network 306 may be configured to store a full copy of part history blockchain 322 for aircraft part 305. In this case, part history blockchain 322 is an aircraft part history blockchain.

Only trusted entity 324 may have permission to access part history blockchain network 306 to read information from and to submit changes to part history blockchain 322 for part 302. For example, trusted entity 324 may be the owner of part 302 or any another entity that controls part 302. For example, without limitation, trusted entity 324 may be a supplier of part 302 or an owner of a vehicle into which vehicle part 304 may be installed. For example, trusted entity 324 may be an airline or other operator or owner of an aircraft into which aircraft part 305 may be installed. Another trusted entity 324, such as the manufacturer of an aircraft or other vehicle, a provider of maintenance and repair operations for an aircraft or other vehicle, or another appropriate entity, also may have permission to read information from and submit changes to part history blockchain 322 for part 302. Another trusted entity 324 may receive permission to access part history blockchain network 306 for part 302 from the owner of part 302.

Trusted entity 324 may use part history tracking software 325 to access part history blockchain 322 at one or more nodes 308, 310, 312, 314, 316, 318, and 320 of part history blockchain network 306. Part history tracking software 325 may be configured to run on a data processing system to provide various functions for accessing part history blockchain 322, reading information from part history blockchain 322, using information read from part history blockchain 322, and storing new information in part history blockchain 322 in part history blockchain network 306. Part history tracking software 325 may be implemented in any appropriate manner to perform the functions described herein.

Part history blockchain 322 comprises a number of blocks. First block 330 in part history blockchain 322 may be created when part history blockchain 322 for part 302 is added to part history blockchain network 306. For example, without limitation, part history blockchain 322 for part 302 may be added to part history blockchain network 306 when part 302 is originally created. In this case, first block 330 in part history blockchain 322 for part 302 may include record 332 of information describing the creation of part 302, information describing part 302 at creation, or other appropriate initial information or various combinations of information for part 302. Alternatively, part history blockchain 322 for part 302 may be added to part history blockchain network 306 at some later time after part 302 is created. In any case, first block 330 in part history blockchain 322 for part 302 may include information that describes part 302 at the time that part history blockchain 322 for part 302 is added to part history blockchain network 306.

First block 330 in part history blockchain 322 may be created and encrypted 333 using a conventional hash value. Subsequent blocks 342, 344, and 346 in part history blockchain 322 may be created and encrypted 343, 345, 347, respectively, using a hash value with each new block referencing the previous blocks in part history blockchain 322. As blocks are added to part history blockchain 322 the robust nature of the encryption increases as the encryption of each subsequent block is based on the previous blocks. As a result, it becomes exponentially more difficult to fraudulently change any of blocks 330, 342, 344, or 346 in part history blockchain 322 without being detected.

Trusted entity 324 with the proper permissions to access part history blockchain network 306 to provide updates to part history blockchain 322 for part 302 may submit transaction 354 to part history blockchain network 306. Transaction 354 may include new information about part 302. For example, without limitation, transaction 354 may be generated in response to the occurrence of event 356 that may change or otherwise affect or involve part 302 and that it is desirable to record in part history blockchain network 306. The information included in transaction 354 for recording in part history blockchain network 306 may include appropriate information describing event 356. For example, information included in transaction 354 for recording in part history blockchain network 306 may include information regarding the creation, use, inspection, reworking, destruction, or other disposition of part 302.

Information included in any new transaction 354 to be added to part history blockchain 322 in part history blockchain network 306 is propagated 358 across part history blockchain network 306 to all nodes 308, 310, 312, 314, 316, 318, and 320 in part history blockchain network 306. At each node 308, 310, 312, 314, 316, 318, and 320 a new block 346 may be added to the copy of part history blockchain 322 maintained therein. The new information regarding part 302 as indicated in transaction 354 may be stored as record 352 of such information in newly added block 346.

In accordance with an illustrative embodiment, event 356 may be the installation of part 302 on a vehicle for which configuration and activity history information is recorded in vehicle configuration and activity history blockchain network 360. For example, event 356 may be the installation of vehicle part 304 on vehicle 204 for which configuration and activity history information is recorded in vehicle configuration and activity history blockchain network 206 in FIG. 2. In this case, part history blockchain network 306 may receive part installation notification 362 from vehicle configuration and activity history blockchain network 360 or from another appropriate source. Part installation notification 362 may identify part 302 being installed on a vehicle and may include any other appropriate information regarding the installation of part 302. In this case, transaction 354 may include any appropriate information regarding the installation of part 302 on a vehicle to be recorded in part history blockchain 322 for part 302.

In response to receiving part installation notification 362 or other information indicating that part 302 is installed, part history blockchain network 306 may send token 364 to aircraft configuration and activity history blockchain network 360 and may lock part history blockchain 322 for part 302 in part history blockchain network 306 to prevent any further changes to the information recorded in part history blockchain network 306 for part 302. Part history blockchain 322 for part 302 may remain locked until token 364 is returned to part history blockchain network 306, indicating that part 302 is removed from the vehicle in which it was installed. Therefore, information regarding the installation of part 302 in record 352 in part history blockchain 322 may be the last information for part 302 that is added to part history blockchain network 306 until part 302 is removed from the vehicle on which it was installed and part history blockchain network 306 is unlocked to allow further information regarding part 302 to be recorded therein.

Later, event 356 may be the removal of part 302 from the vehicle on which it was installed. In this case, part history blockchain network 306 may receive part removal notification 366 from vehicle configuration and activity history blockchain network 360 or from another appropriate source. Part removal notification 366 may indicate that part 302 is removed from the vehicle on which it was installed and may include any other appropriate information regarding the removal of part 302 from the vehicle.

Token 364 may be returned to part history blockchain network 306 along with or as part of part removal notification 366. In response to receiving token 364, part history blockchain network 306 may unlock part history blockchain 322 for part 302 in part history blockchain network 306 to allow changes to the information recorded in part history blockchain network 306 for part 302. In this case, the first transaction 354 to add new information for part 302 to part history blockchain network 306 after part history blockchain 322 for part 302 is unlocked may include information regarding the removal of part 302 from the vehicle on which it was installed.

Trusted entity 324 with the proper permissions to access part history blockchain 322 for part 302 will be able to access part history blockchain network 306 and read information 368 for part 302 from part history blockchain 322. Blocks 330, 342, 344, and 346 in part history blockchain 322 include records 332, 348, 350, and 352, respectively, of information regarding changes to part 302, activities involving part 302, or both, that has been submitted to part history blockchain network 306. Trusted entity 324 may thus determine the current state of part 302 from this information.

Data veracity for part history blockchain 322 at a node 308, 310, 312, 314, 316, 318, or 320 in part history blockchain network 306 may be verified by checking the equivalent part history blockchain at other nodes in part history blockchain network 306 and comparing hash values for the last blocks in the blockchains. For example, to confirm the veracity of data from part history blockchain 322 obtained from node 308 of part history blockchain network 306, trusted entity 324 may compare the hash value for last block 346 in part history blockchain 322 to the hash value of the last block in the corresponding blockchain in one or more other nodes 310, 312, 314, 316, 318, or 320 in part history blockchain network 306.

The illustration of part history tracking system 300 in FIG. 3 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 4:
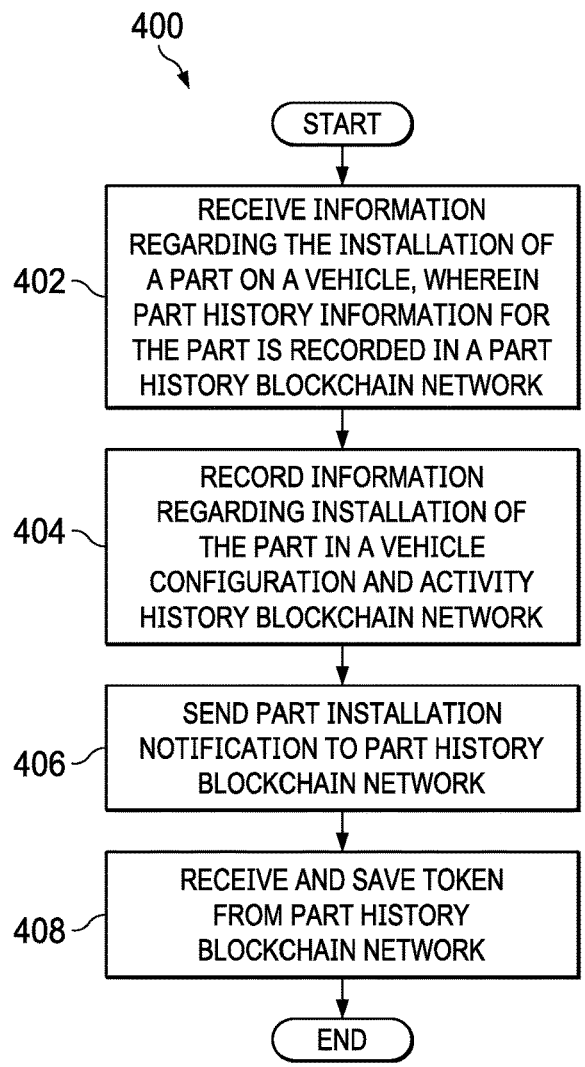
FIG. 4 is an illustration of a flowchart of a process of installing a part on a vehicle using interlocking part history and vehicle configuration and activity history blockchains in accordance with an illustrative embodiment.

Turning to FIG. 4, an illustration of a flowchart of a process of installing a part on a vehicle using interlocking part history and vehicle configuration and activity history blockchains is depicted in accordance with an illustrative embodiment. Process 400 may be implemented, for example, in vehicle configuration and activity history blockchain network 102 in FIG. 1 or in vehicle configuration and activity history tracking system 200 in FIG. 2.

Process 400 may begin with receiving information regarding the installation of a part on a vehicle, wherein part history information for the part is recorded in a part history blockchain network (operation 402). The received information may identify the part installed on the vehicle and may include other information regarding the installation of the part on the vehicle. Information regarding the installation of the part on the vehicle may be recorded in a vehicle configuration and activity history blockchain for the part in a vehicle configuration and activity history blockchain network (operation 404).

A part installation notification may be sent to the part history blockchain network in which part history information for the part is recorded (operation 406). The part installation notification may identify the part that is installed and indicate that the part is installed on a vehicle. The part history blockchain network may lock part history blockchains for the part therein to prevent any new information for the part from being recorded in the part history blockchain network for as long as the part is installed on a vehicle. The part history blockchain network may send a token to the vehicle configuration and activity history blockchain network. Part history blockchains for the part in the part history blockchain network may remain locked to prevent the addition of new information for the part until the token is returned to the part history blockchain network. The token thus may be received and saved by the vehicle configuration and activity history blockchain network (operation 408), with the process terminating thereafter.

Figure 5:
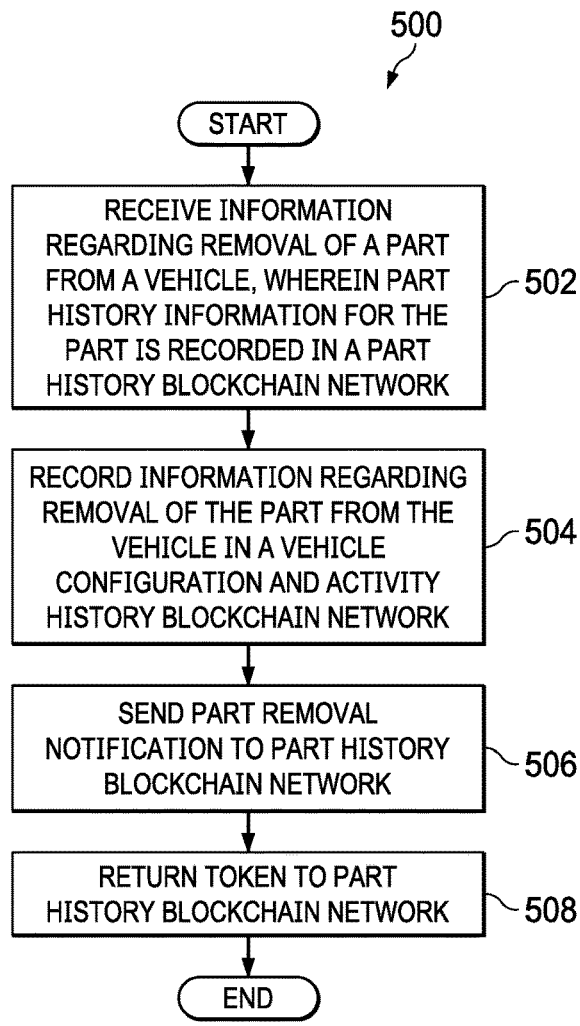
FIG. 5 is an illustration of a flowchart of a process of removing a part from a vehicle using interlocking part history and vehicle configuration and activity history blockchains in accordance with an illustrative embodiment.

Turning to FIG. 5, an illustration of a flowchart of a process of removing a part from a vehicle using interlocking part history and vehicle configuration and activity history blockchains is depicted in accordance with an illustrative embodiment. Process 500 may be implemented, for example, in vehicle configuration and activity history blockchain network 102 in FIG. 1 or in vehicle configuration and activity history tracking system 200 in FIG. 2. Process 500 may be performed at some time after process 400 in FIG. 4 is performed. The part, vehicle, part history blockchain network, and vehicle configuration and activity history blockchain network referred to in the description of process 500 may be the same as referred to in the description of process 400 in FIG. 4.

Process 500 may begin with receiving information regarding the removal of a part from a vehicle, wherein part history information for the part is recorded in a part history blockchain network (operation 502). The received information may identify the part that is removed from the vehicle and may include other information regarding the removal of the part from the vehicle. Information regarding the removal of the part from the vehicle may be recorded in a vehicle configuration and activity history blockchain for the part in a vehicle configuration and activity history blockchain network (operation 504).

A part removal notification may be sent to the part history blockchain network in which part history information for the part is recorded (operation 506). The part removal notification may identify the part that is removed and indicate that the part is removed from a vehicle on which it was installed. The token received from the part history blockchain network also may be returned back to the part history blockchain network (operation 508), with the process terminating thereafter. In response to receiving the token, the part history blockchain network may unlock the part history blockchains for the part therein to allow new information for the part to be recorded in the part history blockchain network.

Figure 6:
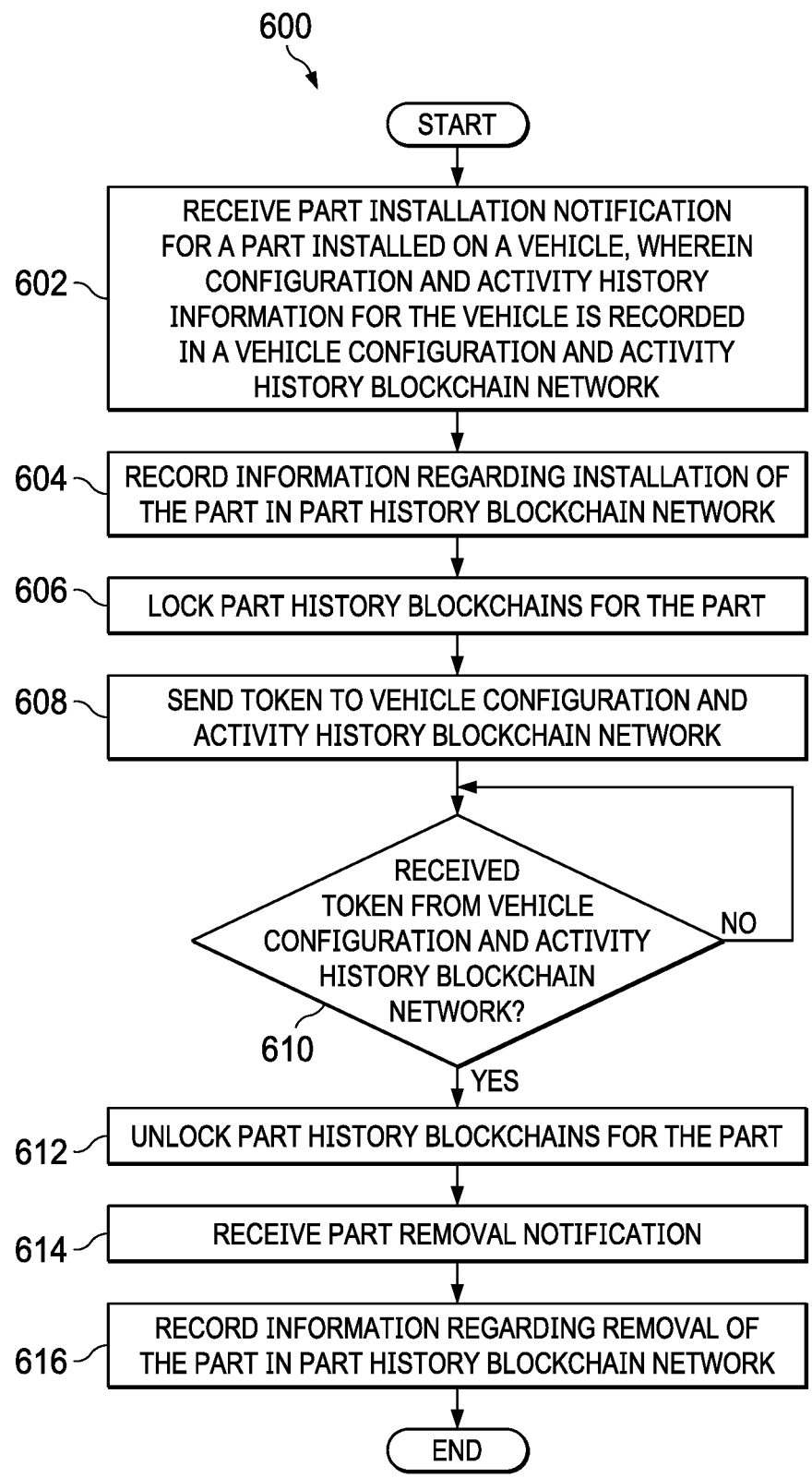
FIG. 6 is an illustration of a flowchart of a process of storing part information for a part using interlocking part history and vehicle configuration and activity history blockchains in accordance with an illustrative embodiment.

Turning to FIG. 6, an illustration of a flowchart of a process of storing part information for a part using interlocking part history and vehicle configuration and activity history blockchains is depicted in accordance with an illustrative embodiment. Process 600 may be implemented, for example, in part history blockchain network 104 in FIG. 1 or in part history tracking system 300 in FIG. 3.

Process 600 may begin with receiving a part installation notification for a part installed on a vehicle, wherein configuration and activity history information for the vehicle is recorded in vehicle configuration and activity history blockchains for the vehicle in a vehicle configuration and activity history blockchain network (operation 602). The part installation notification may identify the part, indicate that the part is installed on a vehicle, and provide other appropriate information regarding the installation of the part on the vehicle. The part installation notification may be provided by the vehicle configuration and activity history blockchain network or by another appropriate source.

Information regarding the installation of the part on the vehicle may be recorded in part history blockchains for the part in a part history blockchain network (operation 604). The part history blockchains for the part in the part history blockchain network then may be locked (operation 606) to prevent any further additions to the information for the part from being recorded in the part history blockchain network. A token may be sent to the vehicle configuration and activity history blockchain network in which information for the vehicle on which the part is installed is recorded (operation 608).

The part history blockchain network will remain locked to prevent the addition of information regarding the part until the token is returned, indicating that the part has been removed from the vehicle on which it was installed. Thus, it may be determined whether the token is received back from the vehicle configuration and activity history blockchain network (operation 610). In response to a determination that the token has been returned, the part history blockchains for the part in the part history blockchain network may be unlocked (operation 612) to allow additional information for the part to be added thereto.

A part removal notification may be received (operation 614). The part removal notification may include information regarding the removal of the part from the vehicle. The part removal notification may be provided from the vehicle configuration and activity history blockchain network in which information for the vehicle from which the part is removed is recorded. Information regarding the removal of the part from the vehicle may be recorded in the part history blockchains for the part in the part history blockchain network (operation 616), with the process terminating thereafter. The information regarding the removal of the part thus may be the first information regarding the part that is recorded in the part history blockchain network after the part history blockchain network is unlocked at operation 612.

Figure 7:
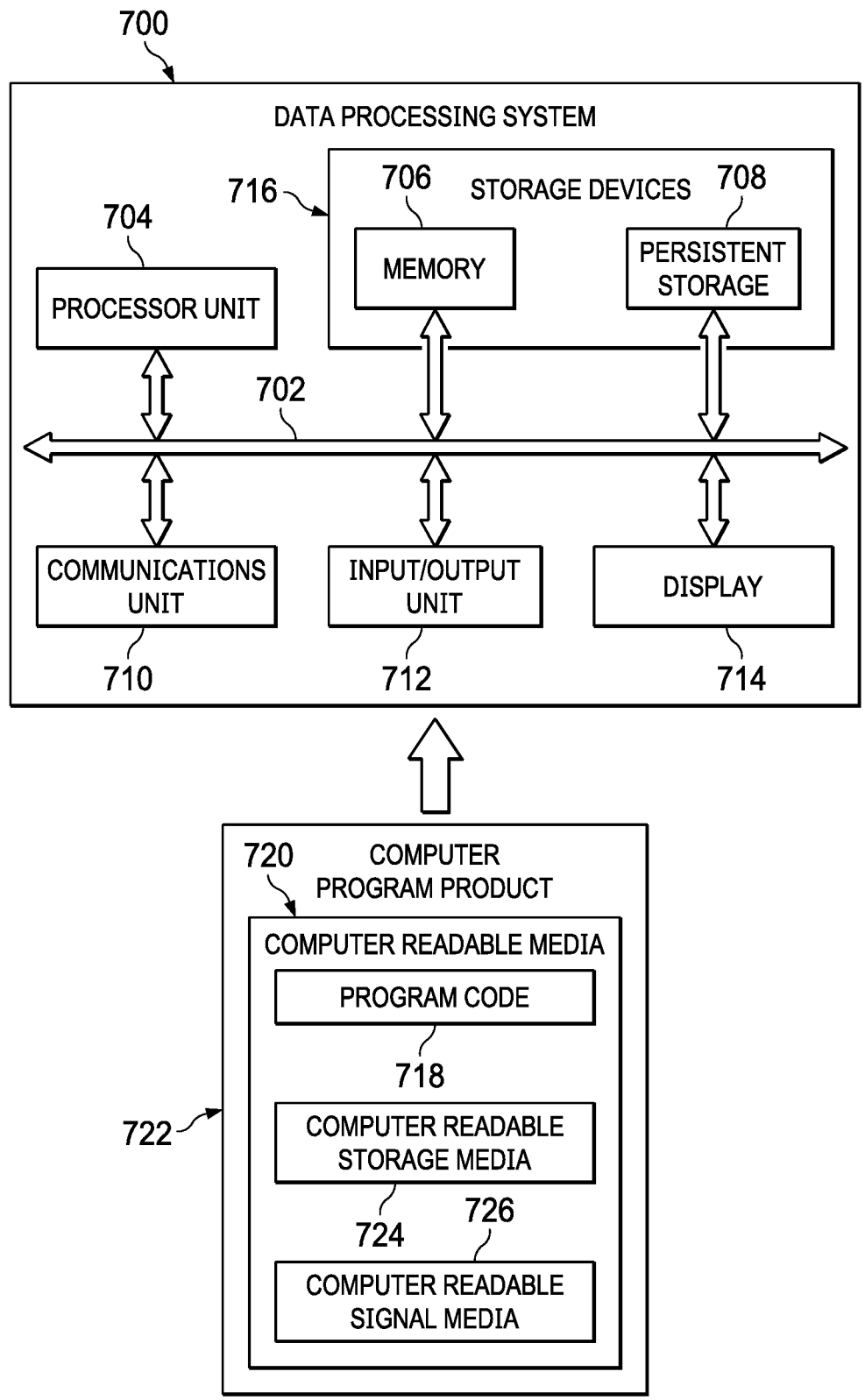
FIG. 7 is an illustration of a block diagram of a data processing system in accordance with an illustrative embodiment.

Turning to FIG. 7, an illustration of a block diagram of a data processing system is depicted in accordance with an illustrative embodiment. Data processing system 700 is an example of one possible implementation of a data processing system for performing the functions of interlocking blockchains as described herein. For example, without limitation, data processing system 700 is an example of one possible implementation of a data processing system for implementing vehicle configuration and activity history blockchain network 102 and part history blockchain network 104 in FIG. 1.

In this illustrative example, data processing system 700 includes communications fabric 702. Communications fabric 702 provides communications between processor unit 704, memory 706, persistent storage 708, communications unit 710, input/output (I/O) unit 712, and display 714. Memory 706, persistent storage 708, communications unit 710, input/output (I/O) unit 712, and display 714 are examples of resources accessible by processor unit 704 via communications fabric 702.

Processor unit 704 serves to run instructions for software that may be loaded into memory 706. Processor unit 704 may be a number of processors, a multi-processor core, or some other type of processor, depending on the particular implementation. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and other suitable information either on a temporary basis or a permanent basis. Storage devices 716 also may be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output (I/O) unit 712 allows for input and output of data with other devices that may be connected to data processing system 700. For example, input/output (I/O) unit 712 may provide a connection for user input through a keyboard, a mouse, and/or some other suitable input device. Further, input/output (I/O) unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program instructions, program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, data processing system 700 may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or both transmit and receive data. Communications unit 710 may be, for example, a modem or a network adapter, two network adapters, or some combination thereof. Further, a memory may be, for example, memory 706, or a cache, such as that found in an interface and memory controller hub that may be present in communications fabric 702.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of maintaining information regarding a part on a vehicle, the method comprising:
   receiving, by a computer, information regarding an installation of the part on the vehicle;
   recording the information for the part in part history blockchains for the part in a part history blockchain network;
   recording, by the computer, the information regarding the installation of the part in vehicle configuration and activity history blockchains for the vehicle in a vehicle configuration and activity history blockchain network; and
   receiving, by the computer for as long as the part is installed on the vehicle, a token from the part history blockchain network, and locking, by the computer, the part history blockchains for the part and thereby preventing adding additional information for the part to the part history blockchains for the part until the token returns back to the part history blockchain network.

2. The method of claim 1, wherein locking the part history blockchains for the part comprises sending, by the computer, a part installation notification to the part history blockchain network, wherein the part installation notification identifies the part and indicates that the part is installed on the vehicle, and wherein the part history blockchain network locks the part history blockchains for the part in response to receiving the part installation notification.

3. The method of claim 1 further comprising:
   receiving, by the computer, information regarding a removal of the part from the vehicle;
   recording, by the computer, the information regarding the removal of the part from the vehicle in the vehicle configuration and activity history blockchains for the vehicle in the vehicle configuration and activity history blockchain network; and
   unlocking, by the computer, the part history blockchains for the part to allow adding the additional information for the part to the part history blockchains for the part in the part history blockchain network.

4. The method of claim 3 further comprising sending, by the computer, a part removal notification to the part history blockchain network, wherein the part removal notification identifies the part and indicates that the part is removed from the vehicle.

5. The method of claim 1 further comprising:
   receiving, by the computer, information regarding a removal of the part from the vehicle;
   recording, by the computer, the information regarding the removal of the part from the vehicle in the vehicle configuration and activity history blockchains for the vehicle in the vehicle configuration and activity history blockchain network; and
   sending, by the computer, the token back to the part history blockchain network to unlock the part history blockchains for the part to allow adding the additional information for the part to the part history blockchains for the part in the part history blockchain network.

6. The method of claim 1, wherein the vehicle is an aircraft and the part is an aircraft part for the aircraft.

7. A computer-implemented method of recording information for a part, the method comprising:
   receiving, by a computer, a part installation notification by a part history blockchain network, wherein the part installation notification identifies the part and indicates that the part is installed on a vehicle, wherein the part history blockchain network comprises part history blockchains for the part that are configured to record the information for the part, and wherein configuration and activity history information for the vehicle is recorded in vehicle configuration and activity history blockchains for the vehicle in a vehicle configuration and activity history blockchain network;
   sending a token from the part history blockchain network to the vehicle configuration and activity history blockchain network; and
   locking, by the computer for as long as the part is installed on the vehicle, the part history blockchains for the part and preventing adding additional information for the part to the part history blockchains for the part until the token is returned back to the part history blockchain network.

8. The method of claim 7, wherein the part installation notification comprises information regarding an installation of the part on the vehicle, and further comprising recording, by the computer, the information regarding the installation of the part on the vehicle in the part history blockchains for the part before locking the part history blockchains for the part.

9. The method of claim 7 further comprising:
   receiving, by the computer, a part removal notification by the part history blockchain network, wherein the part removal notification identifies the part and indicates that the part is removed from the vehicle; and
   unlocking, by the computer, the part history blockchains for the part in response to receiving the part removal notification to allow adding the additional information for the part to the part history blockchains for the part in the part history blockchain network.

10. The method of claim 9, wherein the part removal notification comprises information regarding a removal of the part from the vehicle, and further comprising, by the computer, recording the information regarding the removal of the part from the vehicle in the part history blockchains for the part after unlocking the part history blockchains for the part.

11. The method of claim 7 further comprising:
receiving, by the computer, the token back from the vehicle configuration and activity history blockchain network by the part history blockchain network; and
unlocking, by the computer, the part history blockchains for the part in response to receiving the token back from the vehicle configuration and activity history blockchain network.

12. The method of claim 7, wherein the vehicle is an aircraft and the part is an aircraft part for the aircraft.

13. An apparatus configured to record information for a part, such that the apparatus comprises a data processing system in a part history blockchain network configured to:
receive a part installation notification configured to identify the part and indicate an installation of the part on a vehicle, wherein the part history blockchain network comprises part history blockchains for the part that are configured to record the information for the part, and wherein vehicle configuration and activity history blockchains for the vehicle are configured to record configuration and activity history information for the vehicle in a vehicle configuration and activity history blockchain network;
send a token from the part history blockchain network to the vehicle configuration and activity history blockchain network; and
lock, responsive to receipt of the part installation notification for as long as the part is installed on the vehicle, the part history blockchains for the part to prevent an addition of more information for the part to the part history blockchains for the part until the token is returned back to the part history blockchain network.

14. The apparatus of claim 13, wherein the part installation notification comprises information regarding the installation of the part on the vehicle, and wherein the data processing system is configured to record the information regarding the installation of the part on the vehicle in the part history blockchains for the part before locking the part history blockchains for the part.

15. The apparatus of claim 13, wherein the data processing system is configured to:
receive a part removal notification, wherein the part removal notification comprises information regarding a removal of the part from the vehicle, wherein the information regarding the removal of the part from the vehicle identifies the part and indicates that the part is removed from the vehicle;
unlock the part history blockchains for the part in response to receiving the part removal notification to allow adding additional information for the part to the part history blockchains for the part in the part history blockchain network; and
record the information regarding removal of the part from the vehicle in the part history blockchains for the part after unlocking the part history blockchains for the part.

16. The apparatus of claim 13, wherein the data processing system is configured to:
receive the token back from the vehicle configuration and activity history blockchain network; and
unlock the part history blockchains for the part in response to receiving the token back from the vehicle configuration and activity history blockchain network.

17. The apparatus of claim 13, wherein the vehicle is an aircraft and the part is an aircraft part for the aircraft.

18. The method of claim 1, further comprising a trusted entity with permission to access, read, and submit changes to the part history blockchains for the part.

19. The method of claim 7, further comprising a trusted entity with permission to access, read, and submit changes to the part history blockchains for the part.

20. The apparatus of claim 13, further comprising a trusted entity with permission to access, read, and submit changes to the part history blockchains for the part.

* * * * *